Aug. 2, 1960     E. M. QUEENY     2,947,269
METHOD OF FERTILIZING, USING YELLOW PHOSPHORUS
Filed July 22, 1957
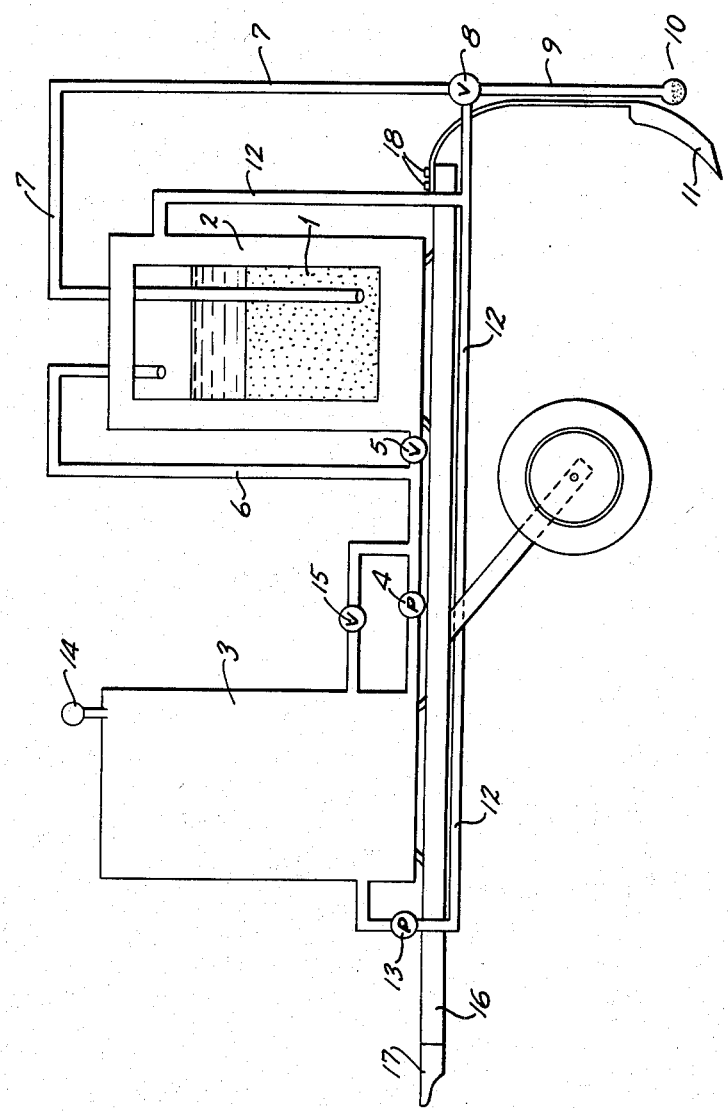
INVENTOR.
EDGAR M. QUEENY
BY Richard W. Sternberg
ATTORNEY

United States Patent Office 2,947,269
Patented Aug. 2, 1960

2,947,269

METHOD OF FERTILIZING, USING YELLOW PHOSPHORUS

Edgar M. Queeny, Kirkwood, Mo., assignor to Monsanto Chemical Company, St. Louis, Mo., a corporation of Delaware Filed July 22, 1957, Ser. No. 673,166

10 Claims. (Cl. 111—80)

This invention relates to a method of soil fertilization. More specifically this invention relates to a method of employing elemental yellow phosphorus directly to the soil by subsurface application in liquid form.

Phosphorus, as well known, is one of the three elements essential to plant growth which must be supplied in major quantities to the soil. It is conventional practice to label fertilizer compositions with the familiar hyphenated number terminology, e.g. 10-10-5, to designate the quantity of nitrogen, phosphorus as $P_2O_5$, and potassium as $K_2O$, present in the composition. The phosphorus therein has variously been supplied in whole or in part in the form of superphosphate, triple superphosphate, dicalcium phosphate, tricalcium phosphate, calcium metaphosphate, fused rock phosphate, raw rock phosphate, colloidal phosphate, monoammonium phosphate, diammonium phosphate, monopotassium phosphate, dipotassium phosphate, orthophosphoric acid, and the like.

Notwithstanding the fact that many soils contain substantial quantities of phosphorus, the phosphorus is bound in a form making it unavailable for assimilation by plants. Furthermore added fertilizers containing potentially available phosphorus often are essentially lost for plant growth by phosphorus fixation. Thus the phosphorus-containing compounds added as soil nutrients are converted to the substantially insoluble iron phosphate, aluminum phosphate and carbonated hydroxyapatite compounds by reaction with the iron and aluminum sesquioxides and the carbonates, etc., present in the soil, rendering a portion of the fertilizer composition unavailable for plant growth. Accordingly, phosphorus is often regarded as the most critical component in the utilization of soils for agricultural purposes.

It is the principal object of this invention to provide a method of fertilizing agricultural soils whereby elemental yellow phosphorus can be directly added to the soil by subsurface application in liquid form and is available in useful form over a relatively extended period of time. Another object of this invention is to provide a means whereby a relatively large quantity of yellow phosphorus can be added to the soil in close proximity to seeds without deleteriously affecting the germination of the seed and the subsequent growth of the plant. Other objects will be apparent from the following disclosure.

It has now been found that elemental liquid yellow phosphorus can be directly applied to agricultural soils by subsurface application to effect the fertilization of crops and can be introduced in close proximity to the seed without inhibiting the germination of the seed or the subsequent growth of the plant. The elemental liquid yellow phosphorus solidifies as discrete particles and is relatively slowly oxidized by the limited oxygen supply in the soil air. Accordingly, the phosphate essential for plant nutrition is formed in situ without the release of excessive heat. It has also been found that the direct use of elemental yellow phosphorus by such localized application reduces the quantity of phosphorus which would otherwise immediately become unavailable to the plants due to phosphorus fixation. Furthermore the localized application of the elemental yellow phosphorus has been found to provide an added degree of safety to inadvertent inhibition of the germination and growth of plant seeds which may occur with the direct use of phosphoric acid in band application in proximity to the planted seed.

The great affinity of yellow (or white) phosphorus for oxygen is well known. Thus liquid elemental yellow phosphorus (melting point 44.1° C.) ignites spontaneously in air and must therefore be protected in some manner from oxidation. This is usually accomplished by handling the elemental yellow phosphorus beneath a layer of water. Notwithstanding this great affinity of yellow phosphorus for oxygen it has been found possible to introduce liquid yellow phosphorus to agricultural soils by subsurface application whereby the yellow phosphorus is slowly oxidized to phosphorus pentoxide therein and forms orthophosphoric acid in situ in the presence of water, or if other nutrients are also supplied to the soil, various phosphate salts may be formed, for example, ammonium phosphate and potassium phosphate.

The liquid yellow phosphorus is transported in the field in a jacketed tank which may be tractor-mounted or a tractor-drawn, trailer-type unit. The phosphorus tank is connected with a tank filled with warm or hot water which fluid is employed to displace the phosphorus through a flexible conduit to one or more tubular openings which are mounted on the mobile unit in a manner which permits the introduction of the yellow phosphorus beneath the soil. The delivery or injector tube employed to effect the subsurface application of the liquid elemental yellow phosphorus can be affixed behind the cutting blade of the plow, and by other suitable means, as currently in general use for the subsurface application of liquid fertilizer compositions. The jacketed phosphorus tank is kept sufficiently warm to maintain the phosphorus in the liquid phase by the circulation of a warm fluid, for example water at about 50° C., through the tank jacket. The length of the delivery tubes from the phosphorus tank should preferably be kept as short as possible to preclude solidification of the phosphorus therein due to excessive cooling surface. Normally it is sufficient that the delivery tubes merely be provided with sufficient insulation to reduce heat loss, but the delivery tubes can be fluid-jacketed lines or can be traced with a hot-fluid line, if desired, and the fluid recycled through a heating system to maintain the phosphorus in a liquid state at all times. Preferably the delivery tubes should be provided with a Y-valve, or equivalent, in close proximity to the phosphorus tank so that the phosphorus supply can be discontinued and the delivery tube drained down and flushed with hot water when the apparatus is shut down long enough that there would be danger of solidification of the phosphorus in the tubes. The phosphorus delivery system should also be provided with a pressure gage, for example on the hot-water tank, which would give warning in a positive-pressure system in the event that the delivery tube orifices became plugged. The yellow phosphorus can be applied to the soil by a gravity-flow system or a positive-pressure application such as a pump or other suitable means. A positive-displacement pump forcing hot water into the phosphorus storage tank is generally the preferred system. The pump action can be coordinated with the speed of the tractor whereby a uniform rate of application of the phosphorus is obtained throughout the field, or the pump action can be synchronized with the tractor to provide uniform periodic spot injections.

A schematic diagram of a phosphorus applicator is set forth in the attached drawing.

This applicator is mounted on and secured to a suitable wheeled steel frame 16 having a tongue 17 at the forward end thereof by means of which the frame 16 can be drawn by a tractor. This applicator comprises an insulated ten-gallon phosphorus feed tank 1 having a jacket 2 through which hot water (e.g. 50° C. water) passes or circulates in order to maintain the phosphorus in a liquid state. The hot water is supplied to the jacket from a twenty-gallon hot-water storage tank 3 by means of a positive-displacement pump 4, the flow of the hot water to and through the jacket 2 being controlled by a T-valve 5. The water in the water-tank 3 can be heated by any suitable means (not shown), for example a propane burner which can be mounted and secured to the steel frame 16. The liquid phosphorus is removed from the phosphorus feed tank 1 by pumping hot water from the hot-water storage tank 3 through pipe 6 employing the positive-displacement pump 4. As the hot water enters the feed tank 1 via pipe 6 the liquid phosphorus contained therein is displaced and conveyed via pipe 7 (which pipe is preferably jacketed to reduce heat losses) through a Y-valve 8 to flexible delivery tube 9 which delivery tube terminates with a suitable delivery orifice 10, e.g. an ejection nozzle, which orifice 10 is positioned behind the cutting blade 11 for cutting the surface of the ground. This cutting blade 11 and delivery orifice 10, respectively, are positioned below the surface of the ground or soil. The cutting blade 11 is secured to, e.g. by bolts 18, and depending from the rearward end of the frame 16 as shown and cuts the surface of the ground as the trailer moves which cutting exposes the soil's sub-surface to the applied or injected phosphorus. After the sub-surface application or injection of the liquid elemental yellow phosphorus the delivery tube 9 and orifice 10 are flushed out with hot water by adjusting the Y-valve 8 and stopping the respective pumps 4 and 13. The hot water which passes or circulates through the jacket 2 of the phosphorus feed tank 1 is recycled via line 12 employing a positive-displacement pump 13 back to the hot-water tank 3. The hot-water tank 3 is equipped with a pressure gauge 14 to give warning in the event the delivery tuge 9 or the orifice 10 become plugged. The applicator is also equipped with a pressure relief valve 15 to be opened in the event of plugging. The respective positive-displacement pumps in this applicator are driven by the moving wheels of the wheeled frame or by other suitable means.

The subsurface application of elemental yellow phosphorus is most useful when simultaneously employed with the planting of the particular crop, whereby the controlled placement of the elemental yellow phosphorus in proximity to the seed can be utilized. Preferably the subsurface applicator system is set up such that the elemental yellow phosphorus is placed at least about one inch to the side and one inch below the seed. However, the relative placement of elemental yellow phosphorus and seed will depend in part on the particular crop, the soil and the climate. Whereas the elemental yellow phosphorus can be applied to greater distances from the seed, it is preferred that it be placed as close as can safely be effected without danger to inhibiting germination of the seed or growth of the plant, since it has been found that this practice generally provides a greater efficiency of the nutrient.

The simultaneous planting and fertilizing of an agricultural soil can be done by employment of a conventional planter attached to the wheeled steel frame 16 set forth in the attached drawing.

It is of course understood that other liquid or solid fertilizer compositions can be supplied prior to, during, or after the planting operation. When other fertilizer compositions are employed, during the planting operation they can be applied through an independent delivery system mounted on the mobile unit as known to the art. If the other fertilizer compositions are applied soon after planting it is preferable that they be limited to surface application so as not to disturb the relative positions of the seed and elemental yellow phosphorus during the early stages of germination and growth, but thereafter conventional injection methods can be employed. Also subsequent further application of elemental yellow phosphorus can be applied in close proximity to the base of the plant, if desired.

The following examples are illustrative of the instant invention.

Example 1

A series of subsurface banded applications of phosphoric acid and elemental liquid yellow phosphorus were made in an agricultural soil having a pH of 6.7. It was found that when the phosphoric acid and elemental yellow phosphorus were applied to the soil at the rates of 60 and 120 pounds of $P_2O_5$ per acre the pH of the soil in the banded area was, respectively, 2.8 and 2.0, and 2.6 and 2.2. It was further found that the pH of the soil one-half inch from the band was 5.2 and 4.6 for the phosphoric acid applications whereas the corresponding values for the elemental yellow phosphorus applications were 6.0 and 5.6. Accordingly, it is seen that the pH effect of the elemental yellow phosphorus is substantially less diffused than the pH effect with phosphoric acid, which fact provides a safety factor against inadvertent inhibition of the germination and growth of plant seeds in the use of the elemental yellow phosphorus. The pH of the soil one inch from the banded area treated with elemental liquid yellow phosphorus was found to be 6.5 and 6.4 for rates of application of 60 and 240 pounds of $P_2O_5$ per acre, which is very nearly the normal pH value of the test soil. Thus, whereas the pH of the bands of soil treated with elemental yellow phosphorus and phosphoric acid were extremely low, it was found that the less diffuse effect with the elemental yellow phosphorus provided a soil acidity well within the growing range of plants within one inch of the treated area. Furthermore in view of the more localized effect of the liquid elemental yellow phosphorus it is seen that phosphorus fixation is reduced by this means.

Example 2

To ascertain the effect of elemental yellow phosphorus as a fertilizer on the germination of various seeds elemental yellow phosphorus, at rates of from 170 to 3400 pounds of $P_2O_5$ per acre (about two-inch depth), was uniformly distributed throughout the test soil by thorough mixing and allowed to stand for 24 hours. Then bean, tomato, and radish seeds were planted therein. It was found that only at the highest fertilizer level, i.e. at 3400 pounds of $P_2O_5$ per acre, were any deleterious effects noted. Thus the growth of the tomato plants was retarded slightly and the germination of the radishes was inhibited. Since tomatoes and radishes do not have particularly hardy seedlings, the phytotoxic effect is not surprising; particularly in view of the fact that the rate of fertilizer application, which caused the injurious effects, is far above that which would normally be encountered in any practical field application.

Example 3

Liquid elemental yellow phosphorus was also applied in bands to soil at a depth of one-half inch and at the rate of 300 pounds of $P_2O_5$ per acre. Radish, tomato, and bean seeds were then immediately planted at a depth of one-quarter inch in rows at right angles to the fertilizer band. It was found that the tomato plants were stunted when the seeds were planted less than two inches from the phosphorus band, the radish plants were stunted when the seeds were planted less than one inch from the phosphorus band, and that the bean plants only showed a phytotoxic effect when the seeds were planted less than one-half inch from the phosphorus band. Accordingly, it is clear that many plants can be planted in close proximity to a relatively concentrated source of elemental yellow phosphorus without any phytotoxic effect to the plant. Again it should be borne in mind that tomato and radish seeds are among the least hardy plants and that the rate of fertilizer application is greater than would normally be employed in actual practice. Accordingly, these evaluation results provide further evidence that the elemental yellow phosphorus can be employed in close proximity to seeds and plants without deleteriously affecting their germination and growth.

*Example 4*

Bands of liquid elemental yellow phosphorus at the rate of 300 pounds of $P_2O_5$ per acre were applied directly in the root zone of a large variety of growing plants (radishes, cucumbers, tomatoes, peas, soybeans, morning glory, cotton, flax, wheat, buckwheat, barley, oats, corn, sorghum, crab grass, barnyard grass and fox tail grass). It was generally found that when the yellow phosphorus was directly applied closer than about one inch to the root zone that the plants were injured. Cotton plants were noted to be particularly hardy and in general the broadleaf crops were less affected than the grasses. Accordingly, subsequent fertilization of growing crops with liquid elemental yellow phosphorus should be effected at a distance greater than one inch from the central root zone. Again it should be noted than the rate of phosphorus application employed in the instant example is substantially greater than would normally be employed in actual practice. Accordingly, further demonstrating that liquid elemental yellow phosphorus can be safely employed in close proximity to growing plants.

Generally the elemental yellow phosphorus would not be employed at rates more than about 120 pounds of $P_2O_5$ per acre and preferably would be employed at the rate of about 50 pounds or less of $P_2O_5$ per acre. Therefore the foregoing examples clearly indicate that there is a large safety factor before rates of application of elemental yellow phosphorus present any reasonable phytotoxicity problem.

It was also found that elemental yellow phosphorus bands covered with as little as one-quarter of an inch of soil presented no flaming problem. For most applications the liquid elemental yellow phosphorus is preferably applied at least about 2 inches beneath the soil surface, but the depth of application will depend on the particular crop and other factors as hereinbefore indicated. As pointed out above, the liquid elemental yellow phosphorus preferably should not be applied closer than about 1 inch to the seed or root zone of growing plants, but to provide efficient utilization of the fertilizer the application should be in as close proximity to said seed or root zone as safe practice indicates to be possible for the particular apparatus employed and the particular crop being treated. In practice it is therefore found preferable to apply the liquid elemental yellow phosphorus in a zone of from about 1 to about 3 inches from the seed or root zone of the growing plant.

The application of liquid elemental yellow phosphorus can be effected with any agricultural soil and is particularly useful in alkaline soils having a pH of up to about 9. However, best results are obtained when the normal soil pH varies from about 6 to about 8, and preferably varies between about pH 6.5 and about 7.5, and more preferably still varies between about pH 6.5 and about 7.0.

I claim:
1. The method of fertilizing an agricultural soil which comprises depositing liquid elemental yellow phosphorus in the soil beneath the surface level thereof and covering the deposited phosphorus with at least one-quarter of an inch of the soil.
2. The method of fertilizing an agricultural soil which comprises depositing liquid elemental yellow phosphorus in the soil at least about two inches beneath the surface level of the soil and covering the deposited phosphorus with at least one-quarter of an inch of the soil.
3. The method of claim 2 wherein the agricultural soil has a normal pH of from about 6 to about 8.
4. The method of claim 2 wherein the agricultural soil has a normal pH of from about 6.5 to about 7.5.
5. The method of fertilizing and planting which comprises depositing liquid elemental yellow phosphorus in an agricultural soil at least about two inches beneath the surface level of the soil, and simultaneously depositing plant seeds in the said soil, the phosphorus and the plant seeds being separated by about one to three inches, and covering the phosphorus and plant seeds respectively with at least one-quarter of an inch of soil.
6. The method of claim 5 wherein the agricultural soil has a normal pH of from about 6 to about 8.
7. The method of claim 5 wherein the agricultural soil has a normal pH of from about 6.5 to about 7.5.
8. The method of fertilizing a soil containing growing plants which comprises depositing liquid elemental yellow phosphorus in said soil at least about two inches beneath the surface level thereof, and covering said phosphorus with at least one-fourth of an inch of soil, the deposited yellow phosphorus being disposed in proximity to the root zone of said plants but at a distance of at least one inch from said root zone.
9. The method of claim 8 wherein said soil has a normal pH of from about 6 to about 8.
10. The method of claim 8 wherein said soil has a normal pH of from about 6.5 to about 7.5.

References Cited in the file of this patent

UNITED STATES PATENTS

| | | |
|---|---|---|
| 1,842,876 | Mason | Jan. 26, 1932 |
| 2,163,065 | Rosenstein | June 20, 1939 |
| 2,222,015 | Bateman | Nov. 19, 1940 |
| 2,781,612 | Dugan | Feb. 19, 1957 |

FOREIGN PATENTS

| | | |
|---|---|---|
| 21,581 | Germany | May 8, 1883 |

OTHER REFERENCES

Publication: Agricultural Chemicals—Liquid Fertilizer, by R. L. Luckhardt, September 1953, pages 45-46-47 required.

Publication: Manual on Fertilizer Manufacture, by Sauchelli, 1954. Only page 13 required.